United States Patent [19]

Hertel

[11] Patent Number: 5,751,246

[45] Date of Patent: May 12, 1998

[54] ACCOUNTABILITY AND THEFT PROTECTION VIA THE GLOBAL POSITIONING SYSTEM

[75] Inventor: Richard J. Hertel, Fort Wayne, Ind.

[73] Assignee: ITT Industries, Inc., White Plains, N.Y.

[21] Appl. No.: 650,739

[22] Filed: May 20, 1996

Related U.S. Application Data

[63] Continuation-in-part of Ser. No. 416,186, Apr. 4, 1995, Pat. No. 5,532,690.

[51] Int. Cl.⁶ .............................. H04B 7/185; G01S 5/02
[52] U.S. Cl. .................. 342/357; 364/449.7; 340/825.49
[58] Field of Search .............................. 342/357, 457, 342/419; 364/449; 340/825.49

[56] References Cited

U.S. PATENT DOCUMENTS

| | | | |
|---|---|---|---|
| 4,973,910 | 11/1990 | Reeser | 342/357 |
| 5,280,295 | 1/1994 | Kelly et al. | 342/463 |
| 5,365,447 | 11/1994 | Dennis | 364/449 |
| 5,400,254 | 3/1995 | Fujita | 364/449 |
| 5,418,537 | 5/1995 | Bird | 342/357 |
| 5,461,390 | 10/1995 | Hoshen | 342/419 |

*Primary Examiner*—Thomas H. Tarcza
*Assistant Examiner*—Dao L. Phan
*Attorney, Agent, or Firm*—Plevy & Associates

[57] ABSTRACT

A system is provided which includes a GPS receiver which determines its location as defined by three spatial coordinates and an associated time reference. The system includes a control logic unit which determines whether the location of GPS receiver is outside the permitted boundaries configured into an internal database in the system. The control logic unit is configured to transmit information related to the location of the GPS receiver to a remotely located interrogator apparatus which communicates back to the control logic unit, instructions regarding determination and reporting of the location of the GPS receiver. An interrogator, if included with a database, can be used as a shopping assistant to aid a shopper in locating desired items by polling a number of the GPS receiver, each associated with a different item, and informing the shopper of the floor, store, aisle or shelf where the item is located.

20 Claims, 4 Drawing Sheets

ACCOUNTABILITY AND THEFT PROTECTION VIA THE GLOBAL POSITIONING SYSTEM

This application is Continuation-in-Part of U.S. application Ser. No. 08/416,186, filed Apr. 4, 1995, now U.S. Pat. No. 5,532,690 entitled APPARATUS AND METHOD FOR MONITORING AND BOUNDING THE PATH OF A GROUND VEHICLE, presently pending issuance as a patent to Hertel, and related to a PCT Application under the same title and inventor filed on Apr. 2, 1996.

FIELD OF THE INVENTION

This invention relates generally to tracking locations through use of GPS signals and more particularly to tracking moving persons and tangible objects for the purpose of accountability and theft protection.

BACKGROUND OF THE INVENTION

Presently, there exist various forms of communicating, tracking, or identifying persons or objects under limited circumstances. Aircraft carry transponders which are interrogated by a ground station. Upon interrogation the transponder sends an identification code and an altitude report. The ground station is a part of the air traffic control radar system, however, radar may not be a part of future air traffic control systems. The transponder may report GPS coordinates of the aircraft in place of radar reflections.

Stores use various means to prevent shoplifting. One means is a tag attached to the product. A clerk removes the tag before the product leaves the store. If not removed, the tag interacts with a transmitter and receiver at the shop's doorway, sounding an alarm.

A system used for animal identification uses a semiconductor chip inserted below the skin. A hand held or workstation interrogator communicates with the chip. The chip supplies an identification code. The code is a pointer into a database, stored outside the animal, providing information relevant to the animal's identification. Likewise, bar code systems read patterns attached to objects as the objects pass a scanner and the code on the object is a pointer into a data base outside the object.

Radio paging services offer low data rate, two way communications via pocket pagers. The base station sends the message with a pager identification (ID) signal to many pagers. The pager with the correct ID captures and displays the message. The person that carries the pager may choose to reply. Bar code systems read patterns attached to objects as the objects pass a scanner. The code on the object is a pointer into a database outside the object.

Wildlife specialists attach radio transmitters to animals to track their activity. The transmitter may be a simple beacon or may include ID and telemetry. Tracking is by directional antenna at a base station or triangulation using several base stations or even satellites.

Weather services get data from buoys in mid-ocean using interrogation via aircraft or satellite.

None of the devices and systems noted above have a self contained means, that is means within the person or object monitored, to measure location, identify, and report deviations from predetermined limits on those locations.

In order to precisely monitor, identify, and report deviations from predetermined limits on those locations, the present invention utilizes a Global Positioning System (GPS) and a GPS receiver.

The GPS, as exemplified by NAVSTAR/GPS, is an accurate, three-dimensional navigation system. The GPS consists of a constellation of twenty one satellites and three spares that orbit the earth twice a day at an altitude of 10,898 miles, transmitting precise timing information. The satellites orbit the earth in six overlapping orbital planes which are based on the equatorial plane of the earth. The orbits of the satellites enable any GPS receiver near the surface of the earth to receive signals from at least four satellites at any one time, although precise position information can be obtained with only three satellites. A GPS receiver can be located in mobile units such as aircraft or ground vehicles to enable them to precisely locate their global positions. A network of ground stations and passive user receivers respond to the information. Each satellite continuously broadcasts pseudo-random codes at L-band frequencies, L1 at 1575.42 MHZ and L2 at 1227.6 MHZ. Each satellite broadcasts a slightly different signal and each satellite broadcasts two types of signals. One of these signals is referred to as a coarse acquisition code (C/A-code), which is a signal that can be received by civilian type GPS receivers. The other signal is referred to as a P-code, which is a signal that can only be received by military type GPS receivers. Ground stations on the earth receive transmissions from the satellites. These transmissions are analyzed and GPS time is compared with universal standard time at the ground stations. Corrections are transmitted to receivers in each of the satellites from the ground station. The signals, which include the time the signal left the satellite, are broadcast from the satellite and decoded by the GPS receiver using triangulation techniques provided by software in the receiver to determine the location. Specifically, the interval between the transmission and the reception of the satellite signal is used to calculate the unit's distance from each of the satellites being used. Those distances are used in the algorithms to compute the receiver's position. The NAVSTAR GPS was originally designed for military use by the Department of Defense, however, it is now authorized for limited civilian use.

A major benefit of the GPS is that the number of users is unlimited because the signals transmitted by the satellites are passively acquired. Thus broad civilian and commercial applications are possible.

GPS receivers are presently employed in automobile and truck GPS navigation systems which comprise moving map displays that aid driver navigation or provide route advice. In some applications, these systems record the path and report to a central authority, however, these systems are not capable of bounding the path of a vehicle.

Accordingly, it is an object of the present invention to provide a system applicable to persons, animals or tangible objects for locating them, identifying them and communicating with remote locations concerning further communications regarding the persons, animals or tangible objects.

SUMMARY OF THE INVENTION

The present system includes a GPS receiver for receiving radio signals from a Global Positioning System to determine the spatial position of the receiver, and thus providing the spatial position of any person, animal or tangible object associated with the GPS receiver. A database responsive to the GPS receiver stores the spatial position coordinates determined by the GPS receiver. A control logic unit processes the data stored in the database appropriate to the desired accountability of the entity associated with the GPS receiver. The system also includes a communication subsystem which facilitates communicating, to a remote location, information related to the data in the database concerning the spatial position of the GPS receiver and receiving from the remote location a response to the control logic unit to process the GPS receiver generated data in the database in a predetermined manner.

The present invention is adaptable to be used in conjunction with an interrogator at the remote location as a shopping assistant. A GPS receiver is associated with a retail item located somewhere in a retail outlet with multiple floors, store, aisles and shelves. The interrogator polls all the GPS receivers till a GPS receiver associated with the desired item is found. The interrogator instructs the communications system to transmit the stored GPS receiver generated location to the interrogator for display to the shopper where the desired item is located. Along the same lines the system can be utilized for accountability of inventory items, luggage, people, animals etc.

BRIEF DESCRIPTION OF THE DRAWINGS

The invention will be better understood with reference to the following illustrative and non-limiting drawings, in which.

DETAILED DESCRIPTION OF THE INVENTION

Current means for effecting various communications related to tracking, identification or data gathering operations include such operations as: prevention of shoplifting through electronic tags, animal identification through an encoded semiconductor chip embedded in the animals skin, two radio communications via radio pocket pagers, bar code readers, wildlife tracking radio based transmitters, and weather related data obtained from buoys in the ocean interrogated through either aircraft or satellites. However, none of these devices or systems noted have the self contained means, that is means within the person or object monitored, to measure location, identify, and report deviations from predetermined limits on those locations.

The present invention includes a GPS receiver that gives a person or object the means to measure its four space coordinates x, y, z, t. The invention includes means to define the space boundary of the permitted motion of the person or object. The present invention records boundary crossings, reports crossings immediately or upon request and, reports location periodically or upon request.

Figure 1:
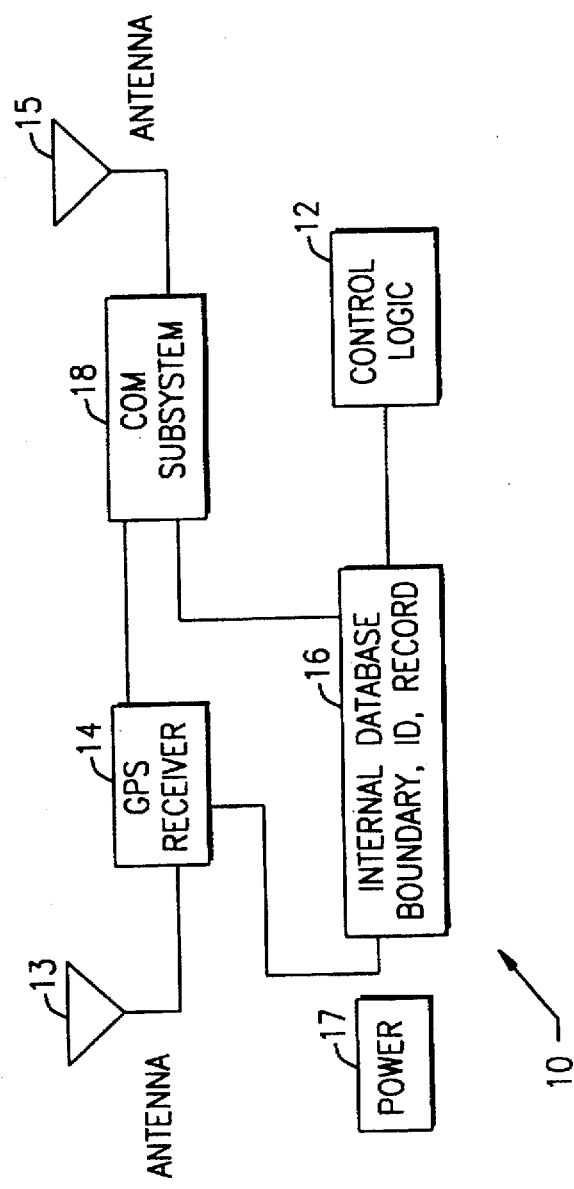
FIG. 1 is a block diagram of the means for accountability and theft protection via GPS in accord with the present invention.

Referring now to FIG. 1 there is shown a block diagram which illustrates the functional means for the accountability and theft protection system, indicated by reference number 10, in accord with the present invention. GPS signals transmitted to the surface by orbiting transponders are picked up by the receiver antenna 13 and directed to the GPS receiver 14. The GPS receiver 14 converts GPS or differential GPS radio signals received from the GPS orbiting transponders into the spatial coordinates of the current receiver location, as defined by the four coordinates x, y, z and t, with x, y, z being the three dimensional spatial point and t being the time at which the x, y, z spatial reference occurs. Persons of ordinary skill in the art will recognize that differential GPS refers to a technique that overcomes the effects of environmental errors and selective availability on the GPS signals to produce a very accurate fix on the receiver's position. In any case, the GPS receiver is adapted to be stored in or on any tangible object, and on any person or animal depending on the desired application and mobility of the object, person or animal being monitored for location.

The coordinates of the GPS receiver 14 are stored in the internal database 16. The internal database may be configured for loading permitted spatial coordinates through a keyboard (not shown) plugged into the receiver 14 through a connector port on the receiver 14 providing access to the internal database 16. The keyboard enables the user to type the permitted spatial coordinates or area coordinates into the database 16. It is also contemplated that data entry into the internal database 16 through the GPS receiver 14 can take the form of some type of data card such as a magnetic stripe or smart card or ROM card. Further any other type of well known database entry means can be used including a radio link, a temporary umbilical connection and/or infrared light beam. In an alternative embodiment of the invention, the internal database 16 may be configured with permitted spatial coordinates by the GPS receiver as the tangible object, person or animal moves along the permitted route or remains in a permitted area. In this embodiment, the GPS receiver 16 operates in a learning mode to learn the permitted spatial coordinates as the object, person or animal remains in the permitted area or moves along the permitted route. Entries to the database 16 may also arrive via the communication subsystem 18, through a direct connection, fixed or temporary connection to the database 16, or be permanently installed in the database 16 at an original place of manufacture.

A control logic unit 12 is also provided in the system 10 of the present invention. The control logic unit 12 can be an integral part of the GPS receiver 14 or a separate component as shown. The control logic unit 12, in either case, is coupled to the internal database 16. The control logic unit 12 includes software and/or hardware that operates to monitor the contents and changes in the internal database 16. Using the internal database 16 contents and a control algorithm, the control logic 12 causes the GPS receiver 14 to update location data and the communication subsystem 18 to send messages via the transmission antenna 15 to the external environment which may include base stations or relay stations linked to other base stations. Alternatively, the control logic unit 12 may be coupled to a warning means such as an audible alarm to warn a person carrying the system 12 that the permitted spatial coordinates are being exceeded, or a means for instituting an electric shock to an animal carrying the system 12 as a means of warning that a permitted area defined by spatial coordinates is being exceeded. Regardless of the means, the warning means can comprise a warning light, a warning buzzer, or an audible and/or visual warning, all of which are intended to warn that the permitted location, area, or route has been exceeded.

The communication subsystem 18 is shown coupled to both the GPS receiver 14 and the internal database 16, however, the communication subsystem may alternatively be coupled to just the internal database 16 and communicate with the GPS receiver 14 through the internal database 16. The communication subsystem 18 acquires messages from the external environment, either through the GPS receiver 14 or through an optional internal receiver and/or transmitter via an optional antenna 15. The communication subsystem stores the received messages in the internal database 16. The communication subsystem 18 transmits the internal database 16 contents on command through the antenna 15. Alternatively, the receiving antenna 13 may also be the type having a configuration for transmitting from the communication subsystem 18 to ground stations or relay stations in range, thereby eliminating the optional transmission antenna 15 shown.

Power 20 comes from one or more conventional means; a public utility, solar cell, battery, generator, etc, or even electromagnetic means from the interrogator. The power is shown not directly coupled to any of the system components because the power can be simultaneously fed to all parts of the system or fed to one of the parts, such as the receiver 14, which in turn can relay the power to other interconnected system parts as needed. Low power or loss of a power source causes a change in the internal database 16. The present invention as shown by the block diagram of FIG. 1, may be practiced without the transmitter antenna 15, wherein all application guidelines, such as boundary limits, alarms, time intervals, etc., are already configured into the system for stand alone operation.

Figure 2:
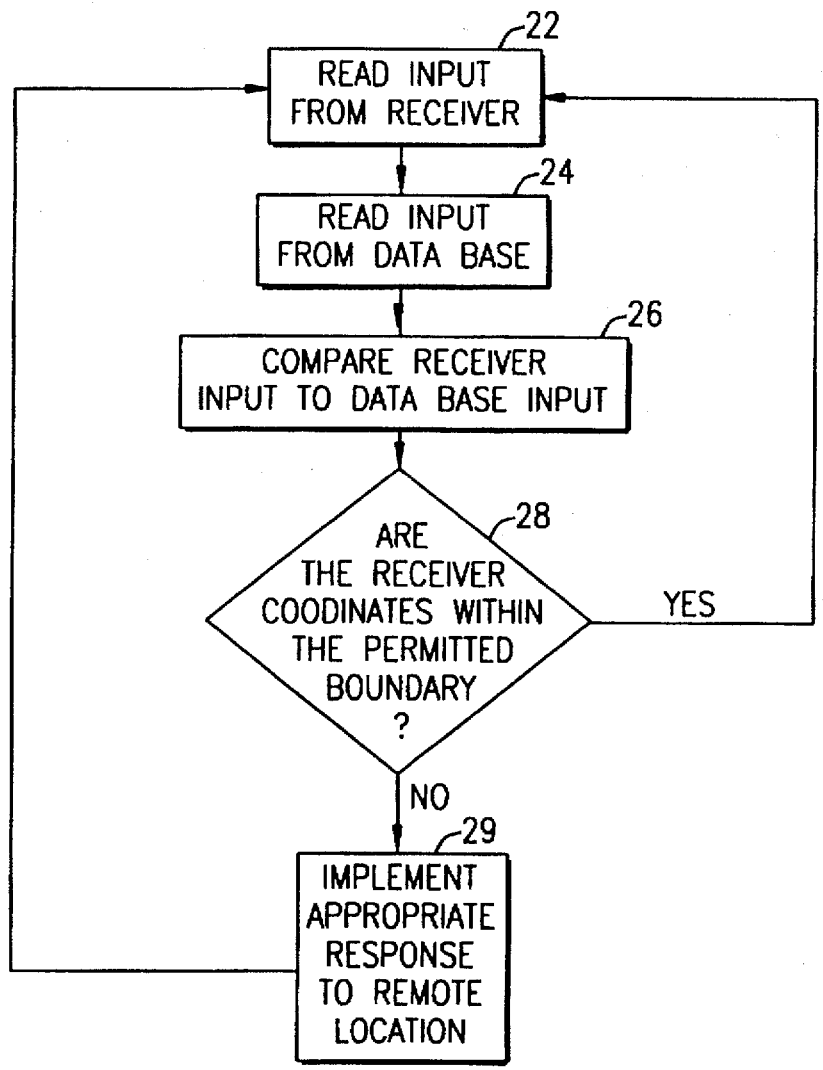
FIG. 2 is a flow chart which illustrates the operation of the means for accountability and theft protection via GPS.

Referring now to FIG. 2 a flow chart is shown which illustrates the operation of the control logic unit 12 in conjunction with the remaining components of the present invention. The operation of the control logic unit 12 can be implemented using primarily software, although portions may be implemented by well known hardware components. Starting at the top of the flow chart with the first step 22, the control logic unit 12 reads the receiver's current spatial coordinates and box 24 indicates that the control logic unit 12 reads the permitted spatial coordinates stored in the internal database 16. Alternatively the control logic unit may be configured to simply direct the communication subsystem 18 to continuously transmit the receiver's spatial coordinates, to a base station or relay station linked to another base station, through the antenna 15. In the next step 26, the control logic unit 12 compares both sets of coordinates to determine if the current spatial coordinates match the permitted spatial coordinates or match spatial coordinates within a permitted area. In step 28 if both sets of coordinates match, the control logic unit 12 repeats 22–26 with an updated set of current spatial coordinates. However, if the current spatial coordinates fail to match the permitted spatial coordinates, the control unit then implements at step 29 an appropriate response to a remote location and may receive a response back from the remote location regarding further processing of the data in the database, depending on the application. The appropriate response 49 may take various forms depending on the application and desired level of monitoring and control. For example, in monitoring the whereabouts of a person carrying the system 10, the control logic unit may simply transmit a message to a monitoring base station that the person has exceeded the permitted spatial coordinates or area. In the case of animal tracking or monitoring the control logic unit 12 may report the animal's location immediately or upon request from a monitoring base station communicating with the communication subsystem 18. Alternatively, the control logic unit 12, in the case of animal monitoring, may cause the communications subsystem 18 to transmit a control signal to a corrective shock mechanism on the animal's body to prompt the animal from continuing on the present path. In the case of monitoring tangible objects, the control logic unit 12 may cause the communication subsystem 18 to transmit a message to a monitoring base station warning that the object's current location is outside the permitted area and continuously transmit back the object's movements. In any case, the appropriate response can take many forms, each being particular to the application and system 10 equipment variations as well as adequate communication links with base stations or relay stations within communication range.

As any one of ordinary skill will ascertain, the present invention has many possible applications. The carrier of the system 10 can be a person, family pet, livestock, wildlife, personal property such as TV sets, microwave ovens, HI-FI stereos, suitcases, art work, goods for sale etc.

Figure 3:
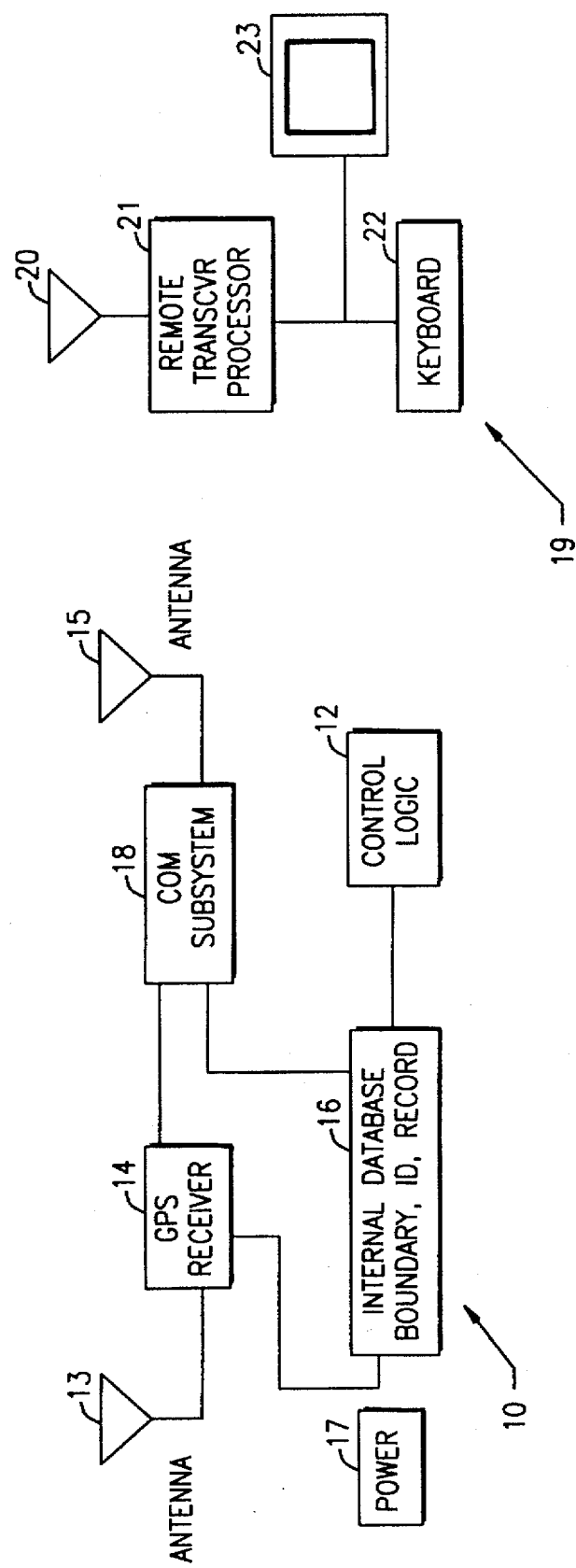
FIG. 3 is a block diagram including a remote interrogator in accord with the present invention.

A viable application is in the area of livestock monitoring and control. The system 10, attached to livestock, allows prompt location using a base station to interrogate the animals. Referring now to FIG. 3 there is shown, operating in conjunction with the GPS based system 10, an interrogation apparatus 19. The interrogation apparatus includes an antenna 20 linked to a remote transceiver processor for generating outgoing and incoming radio transmissions with said communications subsystem 18, a key board 22 and display 23 for facilitating operator inputs and commands to the GPS based system 10 through the transceiver processor 21. The internal database 16 is configured with spatial coordinates corresponding to the permitted range or area of the livestock. The control logic unit 12 directs storage of current spatial coordinate positions determined by the GPS receiver into the internal database 16. The GPS system 10 can communicate to the interrogator when the livestock move outside the boundaries of the permitted area. Preferably, the interrogator 19 initiates retrieval of the spatial position of the livestock as stored in the internal database 16 as of the last stored locations, or instructs the GPS system to determine a current spatial position for the livestock, or have the system 10 transmit to the interrogator 19 all spatial calculations made by the GPS receiver and stored in the database 16 to obtain a history of movements by the livestock so as to anticipate where the livestock move so as to effect interception. The livestock may be domestic or wild. Their location may be in captivity or in the wild. A variation on this application would be research animals that are carriers of dangerous viruses are fitted with a tracking collar containing the system 10. Interrogation as described above can be utilized to intercept any animals that escape the research facility.

The invention installed as part of a two way pager, can allow parents to monitor the location of their children. A child can be fitted to carry the system 10 on his or her person. The internal database can be configured with the permitted route area for the child. If the child exceeds the permitted area or route, the control logic unit 12 causes a transmission to the parents, via a base station or directly, indicating that the child has exceeded the permitted range or route. The parent can utilize the interrogator 19 to instruct the GPS receiver to determine the child's current location. Additionally, the interrogator can prompt the system 10 to transmit the prior location determinations stored in the database 16. The child can also prompt the system 10, by way of a single purpose button coupled to the GPS receiver 14, to determine the child's current spatial position and transmit the same to the parents. The interrogator 19 can communicate the received location to others to intercept the child.

The invention attached to a person, can form a monitoring and restraint system for convicted felons or occupants of security areas. The internal database can be configured with the permitted locations for the person and the control logic unit can record violations of the permitted locations, transmit the location to proper authorities by communicating via the subsystem 18 linked by radio with the authorities and, report the location of the person. The system can also be responsive to the interrogator 19 to determine and transmit the current location or transmit all stored locations to provide a pattern of movements. Current locations transmitted to the interrogator 19 can be utilized by the authorities to restrain the person's movements.

The system installed in personal property, i.e. TV, Hi-Fi, artwork, suitcase, etc., can aid recovery if the personal property is lost or stolen. The control logic unit 12 can detect when the personal property exceeds the permitted movement such as a 50 meter radius boundary and then at low velocity. If the permitted movement is exceeded, the control logic unit 12 can then record the trajectory and thereby aid identification of the thief by causing the communication subsystem 18 to transmit an appropriate message to authorities or the owner. Interrogation of the internal database can help locate hidden objects and identify the owner. The interrogator can be utilized to prompt the GPS receiver to provide updated spatial positions in the event the property is continuously moving. Many personal property items have fixed locations or remain within a 10 meter radius of one location. Deviation from the limit initiates an alarm. The control algorithm can learn, by duration in one spot, pressure or tilt switch, on off use of the protected appliance, what is the proper location and the owner need not enter the location as data.

The invention installed in products, can form the basis for an inventory control system by utilizing the system 10 in the form of an application specific integrated circuit (ASIC). The interrogator 19 can solicit replies from multiple systems 10 each stored in products shelved in a warehouse or stored in various shelves where large groupings of an item are stored. Additional versions of this invention at fixed locations in the storage area make it easy to calculate the geometrical location and quantity of the inventory by triangulation. Upon interrogation, each product or object identifies itself, its location and the warehouse. In the event an item carrying the system 10 is stolen, the interrogator can prompt the GPS receiver, via the communication subsystem 18, to determine the item's current spatial coordinates and the control logic unit 12 can ascertain the corresponding map location from the internal database storage and report the same back to the interrogator for intercepting the item. This scheme be utilized to reduce inventory loss through theft. A variation on this application would be finding lost luggage carrying the system 10 which responds to interrogations by providing an identification and GPS location.

A museum, library, or gallery can use the invention to tag items in its collection. When the item has been moved the control logic unit 12 can determine when coordinates determined by the GPS receiver 14 indicate that the item has been moved, or indicate where the item is presently located. The interrogator 19 can be used to prompt the GPS receiver to determine the spatial coordinates of the item so as to permit the interrogator 19 to aid interception of the item through tracking its movements. The practice may be publicized or kept confidential.

Figure 4:
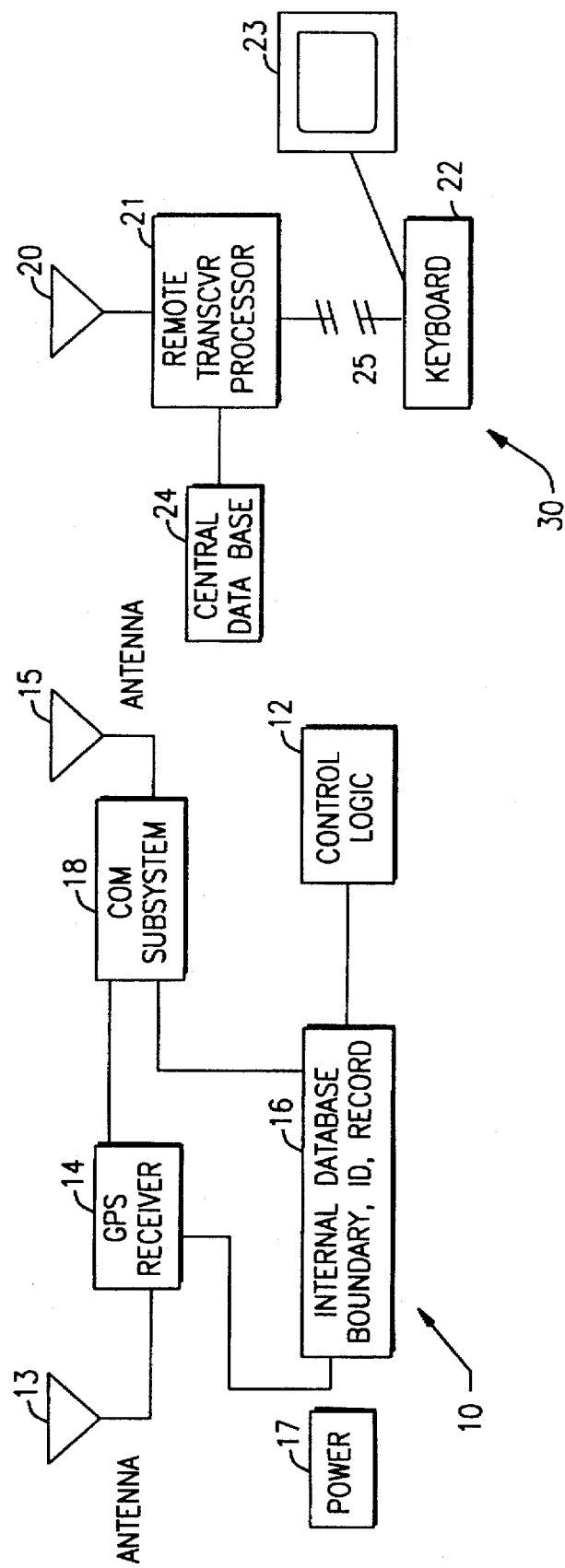
FIG. 4 is a block diagram of the present invention utilized as a shopping assistant.

An extension of the inventory control application is a personal shopping assistant application 30 as shown in FIG. 4. A central database 24 is utilized in conjunction with the remote transceiver/processor 21 to interrogate multiple systems 10 which are associated with items in locations such as a floor, section, store, aisle, shelf. The multiple systems 10 may be interrogated at night, during off-peak shopping hours, or when requested by the user or shop owner. The spatial coordinates received from the multiple systems 10, via the interrogations, are stored in the central database 24, which also includes a correlation of the locations, i.e. floors, sections, stores, aisles, and shelves, to the corresponding spatial coordinates that are determined by and received from the GPS based system 10. The keyboard 22 and display 23, used as a personal shopping assistant, permits the shopper to input a shopping list that is communicated, via communications link 25, to the remote transceiver and processor 21. The remote transceiver/processor 21 in turn accesses the central database 24 for the stored locations of the shopping list items and transmits the same, via communications link 25, back to the keyboard 22 and display 23 unit for viewing by the shopper. The communication link 25 may be hardwired that is fixed or temporary, radio, or infrared (IR). The keyboard 22/display 23 unit may be mobile and carried by the shopper throughout the shopping center and permit random requests for the location of an item. Alternatively, the keyboard 22/display 23 unit can have RAM and a connection port for linking to the transceiver/processor 21 and download the shopping list stored in the RAM and retrieve the locations for storage in the RAM, for display of the location of items one by one as the shopper desires. Each store may have its own remote transceiver/processor unit 21 which only communicates with multiple systems 10 associated with item the store sells. Alternatively, all stores in a large retail center, such as a mall, may have their multiple systems 10 communicate with one central database 24 via one remote transceiver/processor 21.

The invention can be used as a device wherein using its stored program, the invention volunteers information about itself, its location and recent history or it responds with such information upon interrogation.

An extension of the present invention is to add various sensors for temperature, acceleration, humidity, noise, and pressure to a system. The data then travels, via the communication subsystem 18, with an identification and GPS information. Transmissions to a remote location can be periodic or upon instruction by the remote location.

It should be understood that the embodiments described herein are merely exemplary and that a person skilled in the art may make many variations and modifications to these embodiments utilizing functionally equivalent elements to those described herein. Any and all such variations or modifications as well as others which may become apparent to those skilled in the art, are intended to be included within the scope of the invention as defined by the appended claims.

What is claimed is:

1. A system for monitoring and reporting the location of an object, comprising:

GPS receiver means for receiving radio signals from a Global Positioning System which are indicative of a current spatial position of said GPS receiver means;

database means for storing data indicative of said current spatial position of the GPS receiver means, said database means being responsive to said GPS receiver means;

control logic means coupled to said database means for processing the data in said database means; and communication means for communicating information related to the data in said database means, to a remote location and receiving a response back from said remote location for said control logic means regarding the data in said database means, said communication means automatically communicating the data to the remote location without receiving a polling message therefrom;

wherein said GPS receiver means, said database means, said control logic means and said communication means are carried as a unit by the object and wherein said current spatial position comprises the object's spatial position.

2. The system according to claim 1, wherein the object is a plurality of different objects in different locations in a retail outlet and further comprising a plurality of said units and interrogation means located at the remote location, each of the objects carrying a respective one of said units, wherein a shopper uses said interrogation means at the remote location as a shopping assistant for querying said control logic means of each of said units to communicate back to said interrogation means where the objects are located in the retail outlet.

3. The system according to claim 1, wherein the object is a plurality of different objects which are stored as inventory and further comprising a plurality of said units, each of the objects carrying a respective one of said units, said control logic means of each of said units communicating, in response to queries from the remote location, at least one of a plurality of messages which include where the objects are located and if any one of the objects have been moved contrary to location boundaries for the objects stored in the database means.

4. The system according to claim 3, further comprising interrogation means having a remote transceiver for radio communications with said communication means, wherein said queries from said remote location regarding said objects are from said interrogation means.

5. The system according to claim 1, wherein the object is a moving object and said communications means, responds to queries from the remote location by transmitting information relating to tracking and interception of the moving object.

6. The system according to claim 5, further comprising interrogation means at the remote location, said interrogation means including a radio communications transceiver for communicating with said communications means, wherein said interrogation means is operative for tracking the moving object and communicating with authorities for intercepting the moving object.

7. The system according to claim 1, wherein said control logic means is further configured for a learning mode wherein said GPS receiver means determines a plurality of said current spatial positions for storage in said database means while the object is moving about a permitted portion of space.

8. The system according to claim 7, wherein said control logic means, detecting that the object has moved outside the permitted portion of space, directs said communication means to communicate the movement outside the permitted portion of space to the remote location, the remote location responding back to said communications means directing said control logic means to track the movements determined by said GPS receiver means and communicating the tracked locations to appropriate personnel for interception of the object.

9. The system according to claim 8, wherein the object is a plurality of research animals in a confinement and further comprising a plurality of said units, each of the animals carrying a respective one of said units, wherein the research animals are monitored by their respective unit to prevent spread of communicable illnesses in the event the research animals escape from the confinement.

10. The system according to claim 1, wherein the object is a plurality of persons and further comprising a plurality of said units, each of the persons carrying a respective one of said units, the persons being restricted from entering into predetermined areas which are configured into said database means of each person's respective unit, said control logic means of each person's respective unit determining when the person has entered one of said predetermined areas and communicating to predetermined remote locations notice of the entry, the control logic means then receiving at least one of a plurality of responses from the predetermined locations, the responses including monitoring the location of the person, communicating to authorities for interception the person and transmitting all prior locations of the person stored in said database means.

11. A system for monitoring and reporting the location an object, comprising:

GPS receiver means for receiving radio signals from a Global Positioning System which are indicative of a current spatial position of said GPS receiver means;

database means for storing data indicative of said current spatial position of said GPS receiver means, said database means being responsive to said GPS receiver means;

communication means for transmitting the stored data in said database means to a remote location, said communication means being responsive to said database means, said communication means automatically transmitting the data to the remote location without receiving a polling message therefrom;

control logic means for selectively controlling said communication means to transmit predetermined data from said database means to the remote location, wherein said GPS receiver means, said database means, said communication means and said control logic means are carried as a unit by the object and wherein said current spatial position comprises the object's spatial position; and interrogation means at the remote location, for accountability of said unit, said interrogation means including a processor for selectively communicating with said communication means, said processor coupled to input and display means, for interfacing said interrogation means with operators seeking accountability from said unit.

12. The system according to claim 11, wherein the object is a plurality of different objects in a retail outlet and further comprising a plurality of said units and a retail database coupled to said processor of said interrogation means, said interrogation means being input with a list of the objects by a shopper and said retail database storing data correlating spatial positions in the retail outlet with a location description containing the objects, said processor retrieving the current spatial positions from said database means of each unit for displaying where in the retail outlet the objects are located.

13. The system according to claim 11, wherein the object is a plurality of different objects stored as inventory and further comprising a plurality of said units, each of the objects carrying a respective one of said units, said control logic means of each of said units responding to queries from said interrogation means by communicating at least one of a plurality of messages, said messages including where said different objects are located and if any one of said different objects have been moved outside of predetermined boundaries stored in said database means for the objects.

14. The system according to claim 13, wherein said interrogation means includes transceiver means coupled to said processor for radio communications with said communications means of each of said units.

15. The system according to claim 11, wherein the object is moving object and said communications means transmits to said interrogation means, in response to queries from said interrogation means, information related to tracking and interception of the moving object.

16. The system according to claim 11, wherein the object is luggage lost in transport by an airline and said communications means transmits to said interrogation means, in response to queries from said interrogation means, information relating to the luggage's location and said interrogation means further communicating with airline personnel available to receive the luggage.

17. The system according to claim 11, wherein said control logic means is further configured for a learning mode wherein said GPS receiver means determines a plurality of said current spatial positions for storage in said database means while the object is moving about a permitted portion of space.

18. The system according to claim 17, wherein said control logic means, detecting that the object has moved outside of the permitted portion of space, directs said communication means to communicate the movement to said interrogation means, said interrogation means responding back to said communication means, instructing said control logic means for tracking purposes and communicating with appropriate authorities to intercept the object.

19. The system according to claim 11, wherein the object is a person restricted from entering predetermined areas which are configured into said database means, said control logic means determining when the person has entered one of said predetermined areas and communicating to said interrogation means a notice of the entry, said control logic means receiving at least one of a plurality of responses from said interrogation means, said responses including monitoring the location of the person, communicating to predetermined authorities for interception of the person and transmitting all prior locations of the person which have been stored in said database means.

20. The system according to claim 11, further comprising at least one sensor coupled to said control logic means, said at least one sensor being selected form a group of sensors consisting of temperature sensors, acceleration sensors, humidity sensors, noise sensors and pressure sensors, wherein data from said sensors is stored in said database means, said control logic means directing said communications means to include data from said control logic means coupled to said at least one sensor with said current spatial position communicated to said interrogation means, under a plurality of conditions, said conditions including when said control logic means is prompted by said interrogation means to transmit the data from said sensor and when said control logic means is configured to communicate the data from said at least one sensor periodically.

* * * * *